Jan. 12, 1971   H. A. BILTZ   3,553,854
INVENTORY CONTROL MEANS

Filed April 15, 1969   2 Sheets-Sheet 1

INVENTOR.
HARRY A. BILTZ
BY
John H. Widdowson
ATTORNEY

INVENTOR.
HARRY A. BILTZ

United States Patent Office 3,553,854
Patented Jan. 12, 1971

3,553,854
INVENTORY CONTROL MEANS
Harry A. Biltz, Colwich, Kans. 67030
Filed Apr. 15, 1969, Ser. No. 816,359
Int. Cl. G09b 19/18
U.S. Cl. 35—24                                                                         5 Claims

ABSTRACT OF THE DISCLOSURE

This invention is an inventory control means including an identifying control means and a cooperating inventory carriage means having the carriage means rotatable about a stationary indicator on the identifying control means so as to visually indicate stock control and necessity for ordering or manufacturing additional parts. More particularly, this invention is an inventory control means having a plurality of rotatable ring members, each identified by a given indicia on an upright identifying control means and having the ring members rotatable relative to a numerical control ring to indicate the number of parts in stock and, after a certain production period, whether or not the respective elements need to be reordered or reproduced to maintain the required inventory in stock.

---

Numerous types of structures are known to the prior art utilizing color codes and electrical light signals to provide inventory control used by automobile dealers, manufacturers, and the like. However, the prior art devices are substantially complicated in structure and are not operable in a minimum amount of space to provide for the easy visual inventory control of a plurality of items. Also, it has been noted that the prior art devices are complicated in operation; expensive to manufacture; unreliable; and not simple to use nor readily indicating the status of a plurality of various components adapted to be assembled into an end product.

In one preferred embodiment of this invention, an inventory control means is provided including an identifying control means and a inventory carriage means, each mounted in cooperating, adjacent relationship upon a support means. The identifying control means includes an upright support plate having a plurality of horizontally extended, removable card members thereon, each one adapted to indicate a given item such as through a part identification and number. Additionally, the upper portion of the support plate is provided with a laterally extended control pointer positioned adjacent and directed to the inventory carriage means. The inventory carriage means includes a main upright support tube having its lower end rotatably mounted upon the support means; a cap member enclosing the upper open end of the support tube; and a plurality of ring means mounted about the support tube. The support tube is rotatable about a vertical axis on the support means and relative to the identifying control means. The ring means includes an upper numerical control ring; a plurality of spaced support rings; and a plurality of identification ring assemblies mounted between the support rings and rotatable about the support tube. The control ring is provided with consecutive numerical indicia thereabout so as to indicate the number of parts being produced. Each identification ring assembly is provided with a laterally extended ratchet pin assembly and having control tags adjacent thereto. Each ratchet pin assembly is provided with an outwardly biased ball member engagable with spaced upright grooves on the outer peripherial surface of the support tube. The upright grooves correspond numerically to the indicia upon the control ring whereupon the ratchet pin assembly is grasped to move the identification ring assembly to a given position.

One object of this invention is to provide an inventory control means overcoming the aforementioned disvantages of the prior art devices.

Another object of this invention is to provide an inventory control means having adjacent, cooperating identifying control means and inventory carriage means whereupon the carriage means is movable relative to the control means operable to readily indicate the status of a plurality of parts going into a given assembled unit.

One further object of this invention is to provide an inventory control means having a plurality of ring members rotatable about a vertical axis, each ring member identified through a corresponding card member mounted upon an upright support plate whereupon the ring members are movable relative to a given indicia ring member to indicate the number of parts in inventory, the number produced, and the number needed to maintain the proper inventory status.

One further object of this invention is to provide an inventory control means which is simple in construction; economical to manufacture; easy to use; and providing visual means to readily indicate the status of a plurality of given parts needed for an assembled unit in the minimum amount of space.

Various other objects, advantages, and features of the invention will become apparent to those skilled in the art from the following discussion, taken in conjunction with the accompanying drawings, in which.

Figure 1:
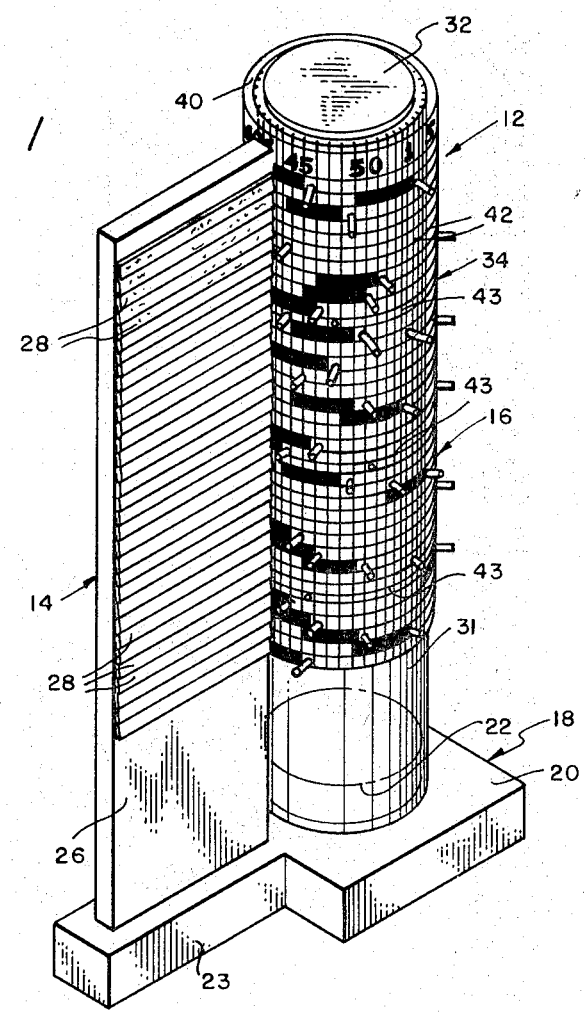
FIG. 1 is a perspective view of the inventory control means of this invention.
Figure 2:
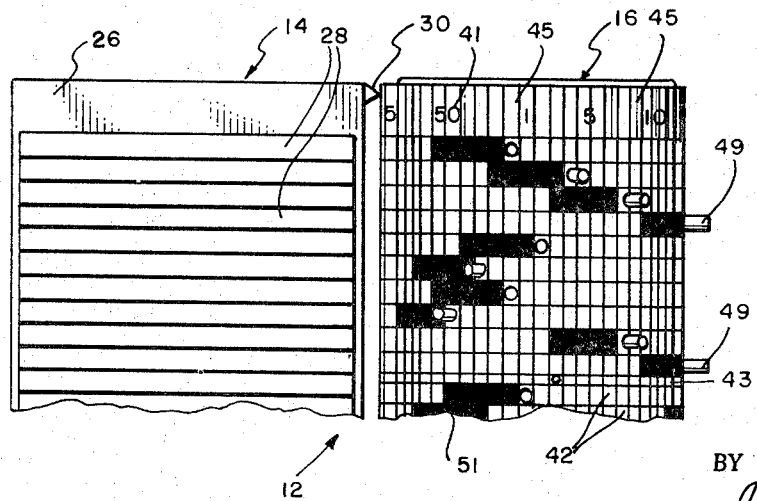
FIG. 2 is a fragmentary of the upper portion of the inventory control means of this invention.

The following is a discussion and description of preferred specific embodiments of the inventory control means of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, the inventory control means of this invention, indicated generally at 12, includes an upright identifying control means 14 positioned adjacent to and in cooperating arrangement with an inventory carriage means 16, both of which are mounted upon a support means 18. The support means 18 can be constructed of any suitable material, heavy enough to assure lateral stability of the attached members and having a main body section 20 with a rotatable support drum 22 mounted thereon and a laterally extended support leg section 23 for receiving the identifying control means 14.

The identifying control means 14 includes a main upright support plate 26 having one end securely anchored to the support leg section 23 and provided with a plurality of rows of clamp elements adapted to receive identification or card members 28 therein. It is noted that the card members 28 are removably mounted within the clamp elements to receive indicia thereon such as indicative of a part number and the part nomenclature such as a clamp member, screw member, bolt member, or the like. Mounted upon the upper end of the support plate 26 is a laterally extended control pointer 30 having its outer tip positioned adjacent the upper end of the inventory carriage means 16 for reasons to become obvious.

The inventory carriage means 16 includes a main cylindrical support tube 31; a cap member 32 mounted in the upper open end of the support tube 31 for enclosing the same; and ring means 34 mounted about the support tube 31 for independent movement within substantially horizontal planes for reasons to become obvious.

Figure 8:
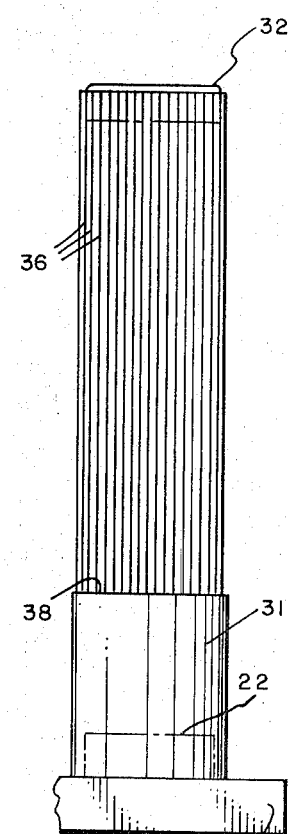
FIG. 8 is a fragmentary elevational view illustrating a main support tube of the inventory control means of this invention.
Figure 6:
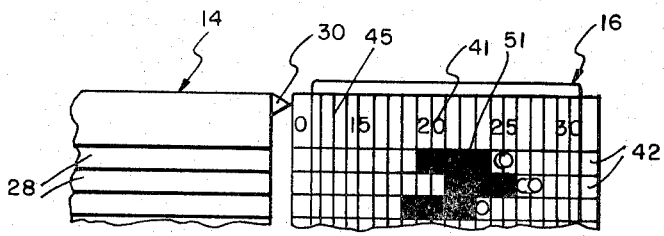
FIGS. 6 and 7 are fragmentary elevational views illustrating the operation of the inventory control means of this invention.
Figure 7:
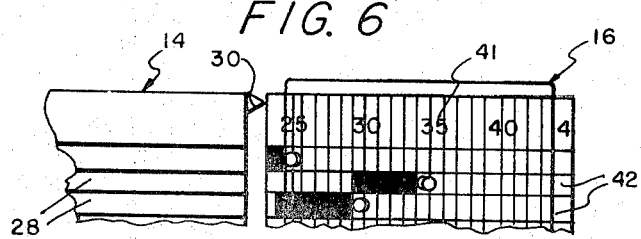

The main support tube 31 may be constructed of a clear plastic material if desired and having the lower end of a size to fit snugly over the support drum 22 so as to be movable therewith and rotatable about a verticle axis. Additionally, the outer peripheral surface of the support tube 31 is provided with a plurality of parallel, vertically extended notches or grooves 36, each indicative of a given unit numerical indication. The grooves 36 are preferably V-shape in transverse cross section for reasons to become obvious. A step portion 38 is provided (FIG. 8) to support the lowermost rings means 34 thereon as will become obvious.

The ring means 34 includes an upper control ring 40; a plurality of identification ring assemblies 42; and a plurality of support rings 43 mounted between a plurality of identification ring assemblies 42 to support the same thereon to assure easy individual rotation about a vertical axis as will be explained. The control ring 40 is provided with numerical indicia 41 about its periphery and provided with upright line indicia 45 to indicate consecutive numerical indication and in this instance, the numerical indicia extends from number one to fifty-five but it is understood that this can be changed as desired and needed. The main thing is that the numerical indicia 41 are equally spaced so as to be lined up with respective ones of the upright grooves 36 on said support tube 31 as will be explained. The control ring 40 may be securely anchored to the outer surface of the support tube 31.

The support rings 43 are similar to the control ring 40 but may be of a very narrow width and are anchored as by screws (not shown) or the like to the support tube 31. The support rings 43 are operable to receive the weight of the adjacent, upper ones of the identification ring assemblies 42 so that the same will be rotatable easily about the vertical axis of the support tube 31. If the support rings 43 were not provided, it is obvious that the lowermost ring assemblies 42 would become increasingly difficult to rotate due to the weight carried thereon.

Figure 3:
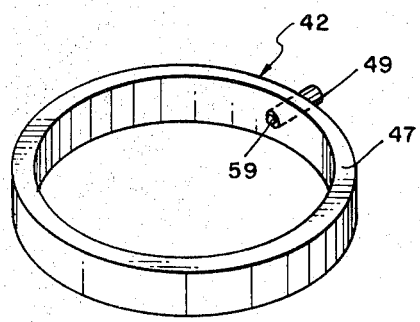
FIG. 3 is a perspective view of an identification ring assembly of the inventory control means of this invention.
Figure 4:
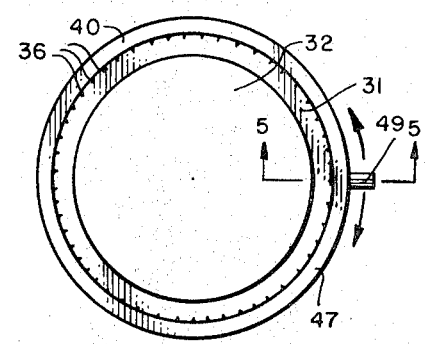
FIG. 4 is a top plan view of the inventory carriage means of the inventory control means of this invention.
Figure 5:
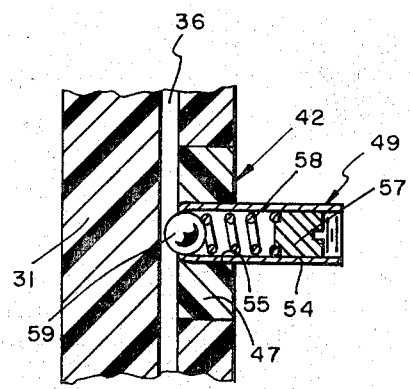
FIG. 5 is an enlarged fragmentary sectional view taken along line 5—5 in FIG. 4.

As shown in FIGS. 3 and 5, the identification ring assemblies 42 are of a generally cylindrical shape 31 having a ring member 47 to fit in a snug relationship over the support tube 31, each having a ring member 47 to fit in a snug relationship over the support tube 31, each having a ratchet pin assembly 49 and a control tag 51 mounted thereon. The control tag 51 can merely be in a painted area of a given unit length such as five or ten units and operates as an alarm signal on visual observation of the inventory control means 12, as will be explained.

The ratchet pin assembly 49, as best shown in FIG. 5, includes a cylindrical housing member 54 having one end extended into a hole 55 within the respective ring member 47 and provided with a set screw 57 threadably mounted within the opposite end of the housing member 54 against a spring member 58 which, in turn, biases a ball member 59 inwardly and laterally of the inner surface of the ring member 47. More particularly, the ball member 59 is positioned against an arcuate end 62 of the housing member 54 to prevent the same from moving outwardly under pressure of the spring member 58. Additionally, it is seen that the set screw 57 may be rotated and moved axially within the housing member 54 to increase and decrease the force of the biasing against the ball member 59. It is noted that the housing member 54 extends substantially outwardly of the ring member 47 and acts as the indicative point of zero position on each of the ring members 47 and operable to be grasped by one's fingers to rotate the entire identification ring assembly 42 about a vertical axis on the support tube 31 in a manner to be explained.

In the assembly and operation of the inventory control means 12, it is seen that the plurality of identification ring assemblies 42 are mounted as desired on the main support tube 31 with each in substantial horizontal alignment with one of the card members 28 upon the identifying control means 12. The support rings 43 are placed between, for example, each ten identification ring assemblies 42 to assure easy rotation thereof. Therefore, it is to be noted that each separate one of the identification ring assemblies 42 is indicative of a part member through its description and inventory number placed upon the respective card member 28. Additionally, the ratchet pin assemblies 49 on each respective one of the identification ring assemblies 42 are adapted to engage one of the grooves 36 on the support tube 31 and held in such a position by the spring member 58 and ball member 59. Each one of the grooves 36 is indicative of a certain numerical number as shown on the control ring 40. It is obvious that the ratchet pin assembly 49 can be grasped to rotate the identification ring assembly 42 about the vertical axis of the support tube 31 to a desired position.

In the use of the inventory control means 12, the uppermost calibrated ring, being the control ring 40, may be used to represent the units to be produced, each unit being, for example, a carburetor assembly. Assuming that there are seventy-five component parts used to complete the carburetor assembly, there would then be at least seventy-five of the identification ring assemblies 42 mounted beneath the control ring 40, each one of which would be in horizontal alignment with respective ones of the card members 28 which have identifying number and description mounted thereon for respective ones of the component parts. Let us assume that the quality and production control department determines that the minimum parts inventory shall be in quantities sufficient to produce at least five carburetor assemblies which is the unit length of the control tags 51. Thereupon, the entire carriage means 16 is rotated about a vertical axis so as to place the laterally extended control pointer 30 at the numerical indicia upon the control ring 40, being that of the numeral "5." Next, inventory is taken and the ring member 47 for each part indicated on respective ones of the identification ring assemblies 42 is turned through the use of the ratchet pin assemblies 49 so the same is aligned vertically with the respective numerical indicia upon the control ring 40 indicative of the number of units that each respective component part has in inventory.

At the end of a certain time period such as, for example, a week, let's assume that forty carburetor assemblies have been assembled and produced. Thereupon, the person in the position of observing quality and production control will rotate the entire inventory carriage means 16 in a clockwise direction, as viewed in FIG. 1, this number of assemblies, namely forty which have been produced. This places the identifying control means 14 through the laterally extended control pointer 30 in line with the indicia 41 of forty-five on the control ring 40. In fact, the control tags 51 are in a length equal to five units and perhaps colored red to readily indicate the necessity for manufacturing or ordering additional part elements so as to produce the desired number of carburetor assemblies plus keeping the required inventory. On rotation of the support tube 31, the operator can easily see by comparison of the control pointer 30 position and the respective identification ring assemblies 42 the part elements that need to be manufactured or ordered.

The inventory control means may also be used to record many items where a constant is involved and may easily be mechanicalized for rotation. It is obvious that individual light elements could be placed within the rotating support tube and aligned with the control pointer on the identifying control means so that when the minimum stock is no longer in stores, then a light would flash to indicate that such must be restocked or manufactured.

It is seen that the invention control means provides a compact unit whereupon a plurality of the identification ring assemblies may be mounted thereupon to assure the number of parts in store for the completed assembly. Also the use of the rotating ring members is very desirable with the control tags so as to give a ready visual indication of the status of the parts relative to the items being produced. This is much more satisfactory than the conventional methods utilizing merely card files and the like as many mistakes are easily made in such usages. Also, the inventory control means of this invention is very desirable as utilizing a minimum amount of space whereupon many items may be accurately charted in a small area. Additionally, it is seen that the inventory control means of this invention is simple to use; economical to manufacture; readily adjustable to provide the same usable for various assembled units; and is attractive in appearance.

While the invention has been described in conjunction with preferred specific embodiments thereof, it will be understood that this description is intended to illustrate the invention, which is defined by the following claims.

I claim:

1. An inventory control means adapted for maintaining the required number of elements required to produce a completed assembly, comprising:
   (a) a support means;
   (b) an identifying control means mounted upon said support means including an upright support member having a plurality of identification members thereon;
   (c) an inventory carriage means movably mounted upon said support means including an upright support member and a plurality of ring means mounted thereon; and
   (d) said ring means including a control ring secured to said support member and a plurality of identification ring assemblies mounted about said support member movable about an axis, each of said identification ring assemblies aligned with respective ones of said identification members and vertically aligned with indicia on said control ring to indicate the number of the elements in stock.

2. An inventory control means as described in claim 1, wherein:
   (a) said identification members being a plurality of elongated, horizontally extended card members, each of which has inventory control indicia and identification indicia thereon, and
   (b) said support member having an upper laterally extended control pointer positioned adjacent said inventory carriage means to indicate an origin point as shown by said indicia on said control ring.

3. An inventory control means as described in claim 1, wherein:
   (a) said support member being a cylindrical tube member mounted upon a support drum which is rotatably connected to said support means, and said control ring anchored to said support tube having a plurality of consecutive numerical indicia indicative of the number of individual elements identified by said identification ring assemblies.

4. An inventory control means as described in claim 3, wherein:
   (a) each of said identification ring assemblies including a cylindrical ring member having a control tab mounted thereon adjacent and behind a ratchet pin assembly; and
   (b) said ratchet pin assembly having a ball member biased by a spring member therein to engagement with said tube member to hold in a given adjusted position aligned with said ring member indicia on said control ring.

5. An inventory control means as described in claim 4, wherein:
   (a) said tube member having a plurality of upright grooves, each aligned with respective ones of said indicia on said control ring, and
   (b) said ball member biased by said spring member into respective ones of said grooves whereby said identification ring assemblies are movable about a verticle axis against the resistance of said spring member to assure only positive movement.

References Cited

UNITED STATES PATENTS

| | | | |
|---|---|---|---|
| 2,593,348 | 4/1952 | Sanderson | 116—135 |
| 2,649,790 | 8/1953 | Johnson | 35—24(.4) |

FOREIGN PATENTS

| | | | |
|---|---|---|---|
| 1,108,923 | 9/1955 | France | 35—24(.2) |

WILLIAM H. GRIEB, Primary Examiner

U.S. Cl. X.R.

40—65; 116—133